United States Patent [19]

Chao

[11] Patent Number: 5,787,843
[45] Date of Patent: Aug. 4, 1998

[54] ANIMAL URINE COLLECTION DEVICE

[76] Inventor: Sophia B. Chao, 1001 Huff Ave., Richlands, N.C. 28574

[21] Appl. No.: 803,447

[22] Filed: Feb. 20, 1997

Related U.S. Application Data

[60] Provisional application No. 60/023,200 Aug. 5, 1996.
[51] Int. Cl.⁶ .................................................. A01K 23/00
[52] U.S. Cl. .................................................. 119/869
[58] Field of Search .................................. 119/868, 869

[56] References Cited

U.S. PATENT DOCUMENTS

| | | | |
|---|---|---|---|
| 2,160,473 | 5/1939 | Dunn | 119/868 |
| 3,090,356 | 5/1963 | Andrisani | 119/868 |
| 3,786,787 | 1/1974 | Weinberger | 119/868 |
| 3,792,687 | 2/1974 | Ehrman | 119/868 |
| 3,817,217 | 6/1974 | Matuka et al. | 119/868 |
| 4,103,645 | 8/1978 | Tyler | 119/868 |
| 4,269,148 | 5/1981 | Holley-Donawa | 119/868 |
| 4,444,152 | 4/1984 | Berardo | 119/868 |
| 4,510,887 | 4/1985 | Lincoln et al. | 119/868 |
| 4,527,991 | 7/1985 | Msarsa | 119/869 X |
| 4,893,587 | 1/1990 | Bailey, Jr. | 119/869 |

*Primary Examiner*—Terry Lee Melius
*Assistant Examiner*—Elizabeth Shaw
*Attorney, Agent, or Firm*—Mills Law Firm PLLC

[57] ABSTRACT

A disposable urine collection device for use by pet owners and veterinarians on small animals such as dogs is disclosed. The urine collection device of the present invention is formed from opposed sheets of a flexible plastic material such as polyethylene being hermetically sealed about the peripheral edges of thereof to form a collection bag. The collection bag is provided with a continuous pressure actuated closure at the top of the bag so as to retain a urine specimen in a sanitary manner. A supporter including a plurality of upwardly extending leg bands is integrally formed with the collection bag to secure the device about the hind quarters of the dog or other animal. In one embodiment the elongated leg bands are adapted to be hand tied about the girth and hind quarters of the animal. In an alternative embodiment the leg bands are provided with detachable fasteners which are utilized to attach the urine collection device of the present invention in its functional position.

6 Claims, 5 Drawing Sheets

ANIMAL URINE COLLECTION DEVICE

CLAIM OF BENEFIT OF PROVISIONAL APPLICATION

This application claims the benefit of U.S. Provisional application No. 60/023,200, filed Aug. 5, 1996, by Sophia B. Chao for Animal Urine Collection Device.

BACKGROUND OF INVENTION

1. Field of Invention

This invention relates to animal waste product collection devices and, more particularly, to a urine collection device for small domestic animals such as dogs.

Urine collection devices for obtaining laboratory specimens from animals are well known to those skilled in the art. In the conventional veterinary practice, such a device for collecting animal waste products typically includes a harness having flexible straps which are adapted for attachment to the hind quarters of the animal and a collection bag detachably connected to the harness. Such a harness usually includes a waist band and leg bands attached thereto which are adapted to completely encircle the respective parts of the animal.

An example of such a waste collection product device is disclosed by U.S. Pat. No. 3,090,356 to Andrisani. This patent discloses an animal toilet garment consisting of an adjustable harness whereon detachable collection bags are installed for the collection of urine and fecal matter.

Another example of such a device is disclosed by U.S. Pat. No. 4,444,152 to Berardo. This patent discloses an animal waste collection device adapted for attachment to the hind quarters of the animal and a collection bag detachably connected to the harness.

However, such animal waste product collection devices are difficult for the owner to adjust and install as well as being uncomfortable and cumbersome for the animal. Of course, the removal of a specimen from the detachable collection bag is an unpleasant task for the pet owner.

Thus, the present invention has been developed to provide a completely disposable urine collection device for small animal such as canines to solve the above problems and other shortcomings of the prior art.

2. Description of Related Prior Art

U.S. Pat. No. 3,090,356 to Samuel Andrisani discloses an animal toilet garment to catch and retain in a removable and/or disposable container the animal's rear body waste products, mainly feces and urine, and to additionally serve as a birth control device or any other use.

U.S. Pat. No. 4,444,152 to Carmen R. Berardo discloses a device for collection of animal waste comprising a harness adapted for attachment to the hind quarters of the animal and a collection bag detachably connected to the harness. The fasteners connecting the bag to the harness are of a type permitting the use of any flexible bag and in particular permit the use of inexpensive disposable plastic garbage bags.

U.S. Pat. No. 4,893,587 to Aubrey Bailey, Jr. discloses a urine collection device including a disposable collection bag removeably mounted on a framework of flexible straps. The collection bag has a front portion and a back portion being sealed along the bottom and sides so as to form a container, and further includes a coacting continuous fastener along the open top portion of the front portion to selectively seal the container.

U.S. Pat. No. 3,817,217 to Jozsef Hartmuth Matuka, et al. discloses a sanitary refuse receiver and harness for use on small animals, such as dogs. The solid waste refuse or excrement of the animal is received and contained therein, and may be disposed of in a sanitary manner. The sanitary waste receiver includes a disposable bag for containing the animal's waste materials in a harness, which is adapted to be removeably fixed on the haunches of an animal.

U.S. Pat. No. 4,510,887 to Kay L. Lincoln, et al. discloses an animal fecal collection system for an animal such as a canine, which allows separate collection of urine and feces without cross-contamination. A fabric supporter is positioned on the hind quarters of the animal, which supporter has a harness which secures the same to the animal.

U.S. Pat. No. 4,103,645 to Harold E. Tyler discloses a waste bag for animals such as small pets. The waste bag is attached to the body of the animal by means of trousers or a harness which is worn by the animal. The bags are connected with mounting pads which snap on to the trousers or harness.

U.S. Pat. No. 3,792,687 to Alexander Ehrman discloses an animal waste receiving device for receiving waste products of a dog including a harness that is securely placed on the dog. The harness has two elongated straps, each adapted to extend from the top of the hind end of the dog, under a respective leg to a buckle on the side of the dog. A normally flat, opaque polyethylene bag having an opening and two side flaps is disposed about the opening and connected to the harness in a position to receive the waste products of the dog.

Finally, U.S. Pat. No. 3,786,787 to Morton-Weinberger discloses a device for disposing of dog droppings of which at least the bag portion thereof is disposable. The harness includes back and belly strip means which are connectable to encircle the dog at the girth, and a pair of bag-carrying strap means extending from the back strap to the belly strap and adapted to pass inside the hind legs of the dog.

SUMMARY OF THE INVENTION

After much research and study of the above mentioned problems, the present invention has been developed to provide a completely disposable urine collection device for small animals such as dogs which is convenient and effective for both the pet owner and the animal.

The urine collection device of the present invention includes a collection bag which is integrally formed with a flexible supporter that is secured about the hind quarters of the animal. The urine collection device is formed entirely of an inexpensive plastic material such as polyethylene and may be disposed of after a specimen is collected. In addition, the urine collection device includes a pressure actuated closure so that the specimen may be sealed after being collected for transport to a veterinary clinic in a sanitary manner.

In view of the above, it is an object of the present invention to provide an animal urine collection device which is completely disposable to eliminate the cleaning and maintenance associated with the harnesses and supporters of the prior art.

Another object of the present invention is to provide an animal urine collection device having a pressure actuated closure to permit the collection container to be sealed after a urine specimen is collected.

Another object of the present invention is to provide an animal urine collection device which may be utilized by the pet owner at home or, in the alternative, by veterinary personnel in a clinical setting.

Another object of the present invention is to provide an animal urine collection device which is convenient for the pet owner to apply and also comfortable for the animal to wear.

Other objects and advantages of the present invention will become apparent and obvious from a study of the following description and the accompanying drawings which are merely illustrative of such invention.

DETAILED DESCRIPTION OF THE PREFERRED EMBODIMENT

Figure 1:
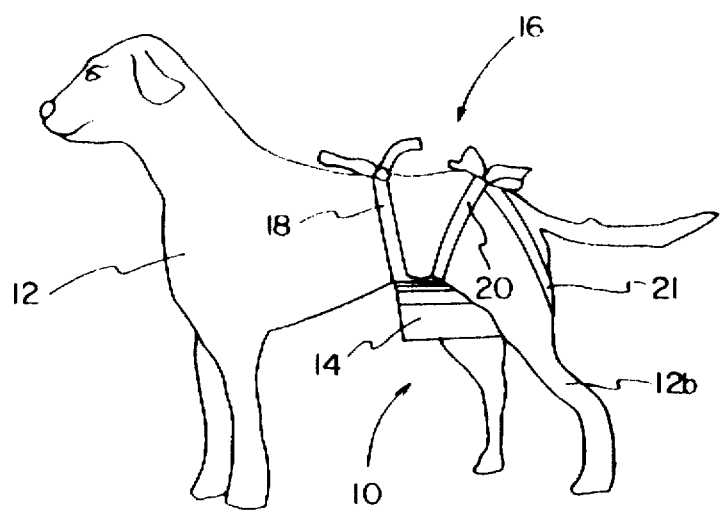
FIG. 1 is a perspective view of the urine collection device of the present invention installed in its functional position about the hind quarters of a dog.

With reference to the drawings, there is shown therein a disposable, noninvasive urine collection device in accordance with the present invention, indicated generally at 10 and illustrated in FIG. 1. The urine collection device 10 is shown installed in its functional position about the hind quarters of a dog 12.

The urine collection device 10 includes a collection bag or pouch 14 which is integrally formed with a flexible supporter, indicated generally at 16 that is secured about the hind quarters of the dog 12.

Figure 2:
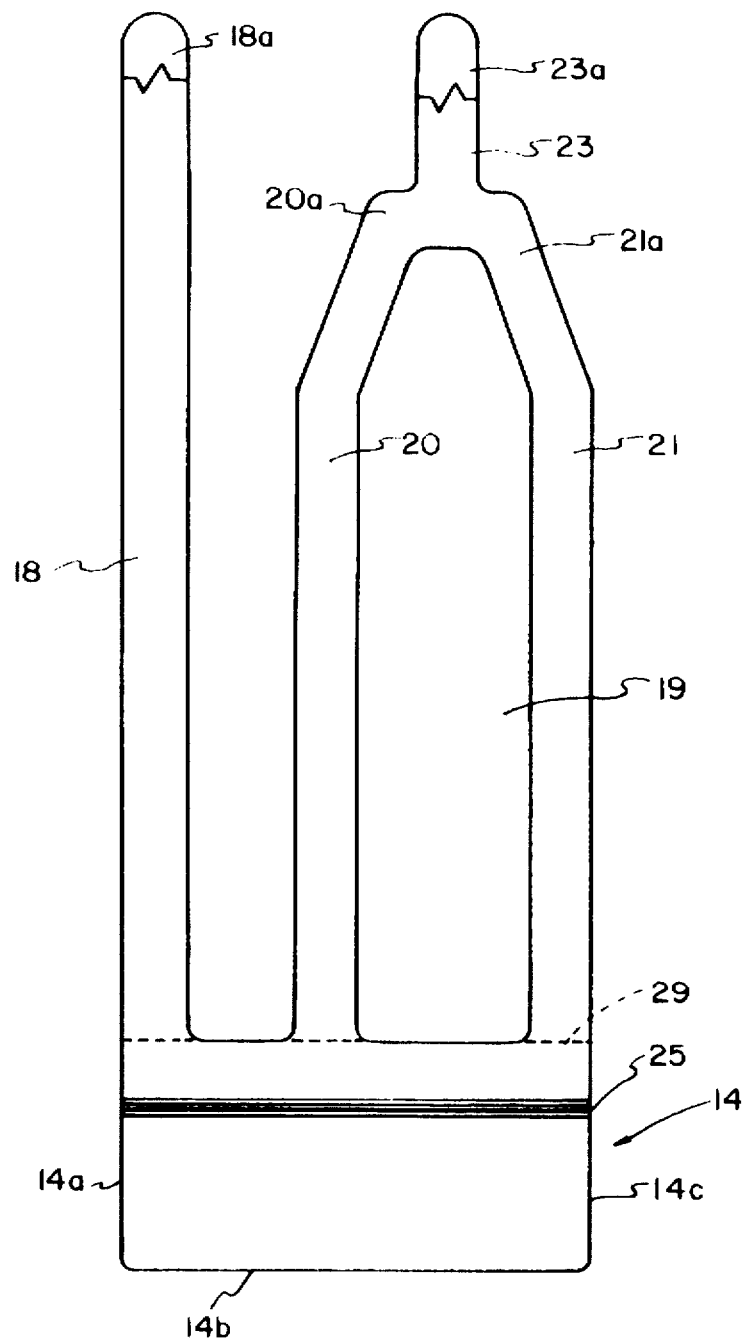
FIG. 2 is a side elevational view of the urine collection device showing the details of its construction.

In the preferred embodiment, the supporter 16 includes an elongated waistband 18 and a pair of upwardly converging leg bands 20 and 21 which converge at the distal ends 20a and 21a thereof to form a tail band 23 as more clearly shown in FIG. 2.

It will be appreciated by those skilled in the art that the urine collection device 10 is formed from two sheets of flexible plastic material such as polyethylene sheet or other suitable materials arranged in generally parallel, overlaying relation. In this arrangement, the peripheral edges of the collection pouch 14a, 14b, and 14c are hermetically sealed so as to retain a urine specimen in a sanitary manner.

Collection pouch 14 may be provided with a pressure actuated closure 25 at an upper edge thereof in order to seal the pouch 14 after a urine specimen is collected. A continuous pressure actuated closure of the type sold under the tradename ZIPLOC is suitable for this purpose.

Since such continuous pressure actuated closures are well known to those skilled in the art, further detailed discussion of the same is not deemed necessary.

Figure 3:
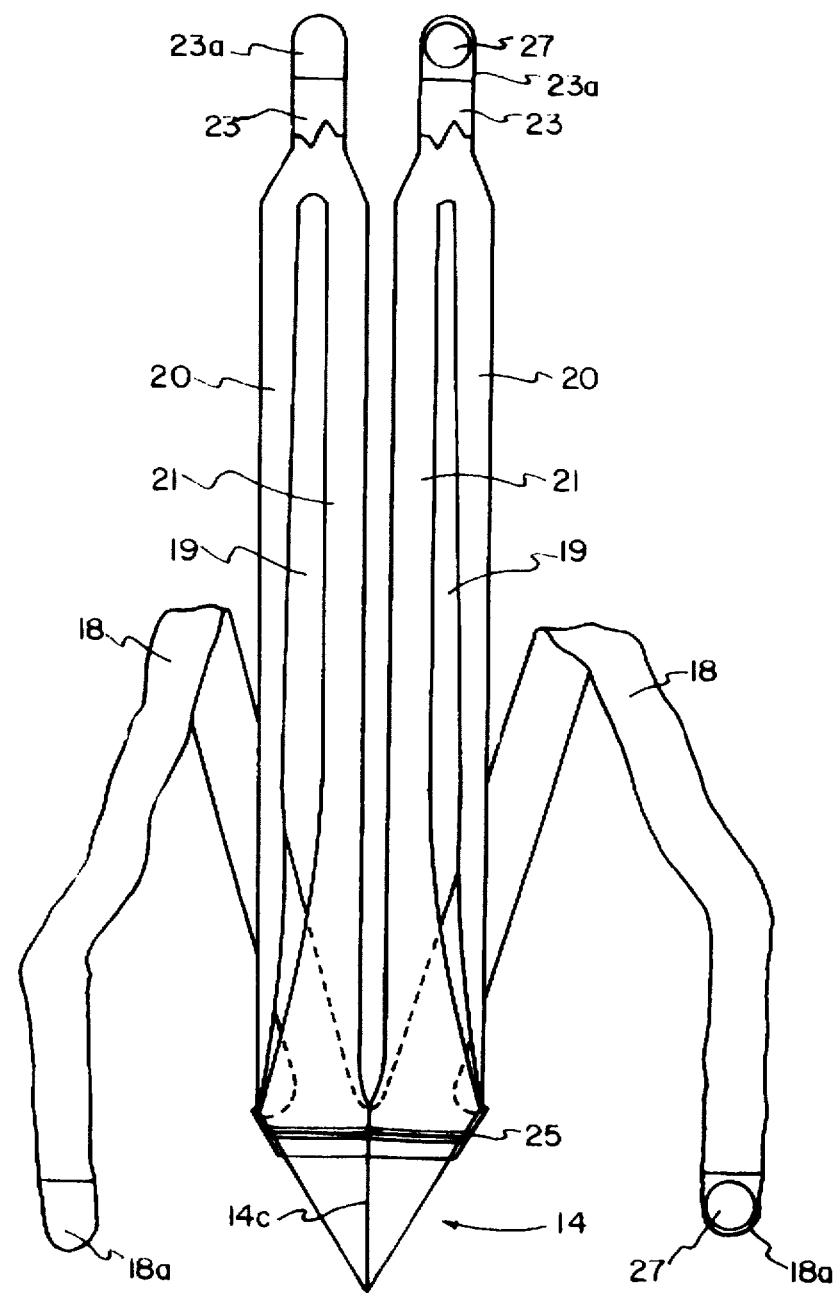
FIG. 3 is an end perspective of the urine collection device showing the collection pouch in an open condition.

The supporter 16 including the waistband 18, leg bands 20 and 21, and the tail band 23 are cut from the two sheets of plastic material using known techniques so as to form matching halves thereof and are integrally formed with the upper edge of pouch 14 as clearly shown in the side elevation in FIG. 3.

Figure 4:
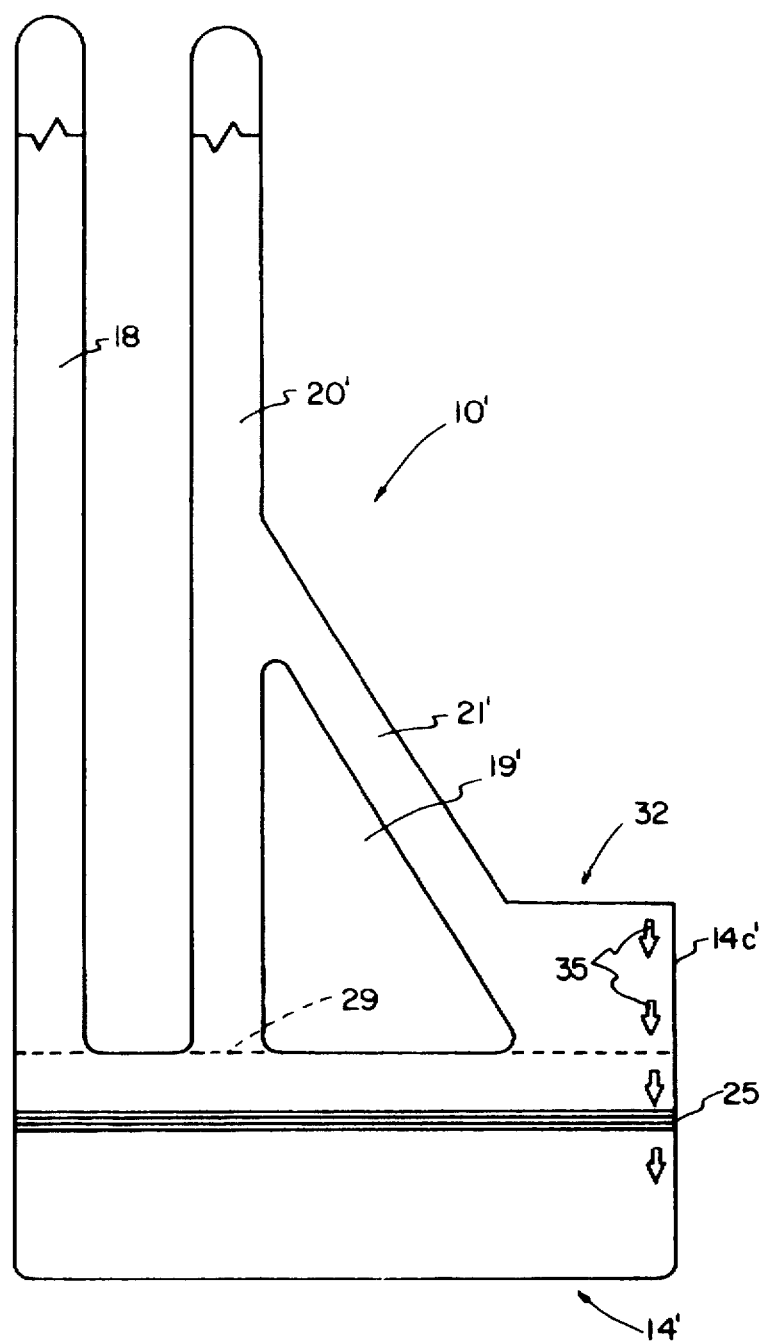
FIG. 4 is a side elevational view of an alternative embodiment of the urine collection device.

Referring now to FIG. 4 there is shown therein an alternative embodiment of the urine collection device 10' having specific adaptations for use with a female dog. It can be seen at that the alternative device 10' includes a vulvar shield, indicated generally at 32, which is adapted to closely conform to the external genitalia of the female dog. Shield 32 is effectively an extension of the rear peripheral edge 14c' of the collection pouch 14'.

In order to support the modified device 10' in the correct anatomical position the leg bands 20' and 21' are modified to provide support for the shield 32 adjacent the vulva of the female dog, resulting in the modified triangular leg opening 19' as illustrated in FIG. 4.

In practice as urine is discharged from the female dog, it will be deflected by the vulvar shield 32 and will flow downwardly into the collection pouch 14' as indicated by directional arrows 35.

As various changes in the above construction could be made to accommodate different sizes of pets, without departing from the scope of the invention, the matter contained in the accompanying drawing figures shall be interpreted as illustrative and not restrictive in any sense.

In the normal use of the urine collection device 10, the same is positioned on the dog 12 such that each of the animal's rear legs 12b are inserted through the elongated openings 19 formed between each respective pair of leg bands 20 and 21. Thereafter, the respective halves of the tail band 23 are drawn upwardly such that the collection pouch 14 completely encircles the appropriate parts of the animal.

Once the pouch 14 is arranged in the appropriate position, the terminal ends of the tail band 23 are simply tied in a conventional manner to secure the same in position.

Thereafter, the waistband 18 is similarly drawn upwardly to secure the collection pouch 14 in position and simply tied about the animal's midsection to further support the collection pouch 14.

In yet another embodiment of the urine collection device 10, the terminal ends 23a of tail band 23 and the terminal ends 18a of waist band 18 are provided with detachable fastening means 27 to facilitate securing the supporter 16 about the animal's hind quarters and to provide for convenient adjustment thereof.

Such detachable fastening means 27 may include, for example, a double-sided adhesive tape sold under the tradename REMO ONE which is particularly well adapted for this purpose having adhesives of two different strengths on the opposed surfaces thereof Since such detachable fastening means are well known to those skilled in the art, further detailed discussion of the same is not deemed necessary.

It will be appreciated by those skilled in the art that as the matching halves of leg bands 20 and 21 and the waistband 18 are drawn upwardly and outwardly about the animal's hind quarters, the tension applied thereto serves to hold the collection pouch 14 in an open position about the respective parts of the animal providing an effective means of collecting a urine sample.

After the urine specimen has been obtained, the pouch 14 may be effectively sealed by the use of the closure 25 to contain the specimen therein in a sanitary manner.

Thereafter, the supporter 16 is conveniently removed from the animal by releasing the detachable fastening means 27 and the urine specimen delivered to the veterinarian for processing.

For convenience, the leg bands 20 and 21 and the waistband may be cut away from the collection pouch 14 along a cut line 29 using ordinary scissors to provide for more convenient handling of the specimen.

Figure 5:
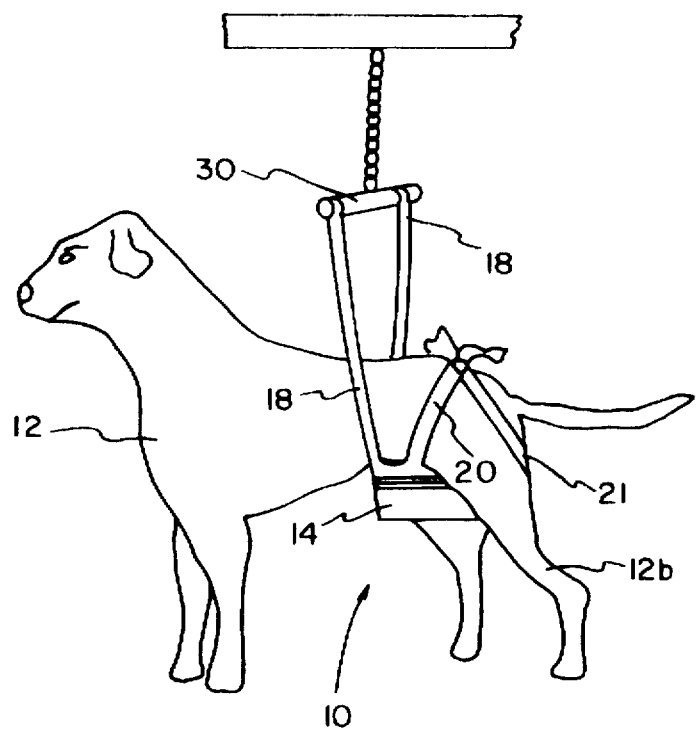
FIG. 5 is a perspective view of the urine collection device illustrating an alternative use thereof in combination with an overhead support.

In an alternative method of use, the urine collection device 10 can be utilized in the manner of a sling as illustrated in FIG. 5. Using this technique, the urine collection device 10 is secured to an overhead support bar 30 which is typically available in a veterinary clinic and forms no part of the present invention.

Utilizing the support bar 30, the terminal ends 18a of the waistband 18 and/or the terminal ends 23a of the tail band 23 are secured to either end of the support bar 30 in order to suspend the urine collection device 10 about the respective parts of the animal. In all other respects, the use of the urine collection device 10 remains the same once a specimen has been obtained.

From the above it can be seen that the animal urine collection device of the present invention provides a sanitary, disposable method of obtaining a urine specimen for laboratory analysis. The urine collection device is simple and convenient for the pet owner to install, as well as comfortable for the animal to wear.

In addition, the urine collection device is relatively simple to manufacture providing for a cost effective, entirely disposable device.

The terms "top", "bottom", "side", and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A disposable urine collection device for a small animal such as a canine comprising:

collection pouch means formed from a pair of parallel sheets of a flexible material being sealed about the peripheral edges thereof so as to form a top opening therein, pressure actuated closure means operatively associated with said sheets for closing said top opening; and supporter means including a plurality of elongated bands being integrally formed with said pouch means and extending upwardly therefrom, said elongated bands being integrally formed with said pouch means and converging upwardly to form a leg opening therebetween, said opening being adapted to receive a hind leg of said animal and adapted for attachment about the hind quarter of an animal such that a urine specimen may be collected within said pouch means when said device is installed on said animal.

2. The urine collection device of claim 1 wherein said closure means is a continuous fastener.

3. The urine collection device of claim 1 wherein said elongated bands are adapted to be hand tied to secure said device about said hind quarters of said animal.

4. The urine collection device of claim 1 wherein said supporter means includes detachable fastening means disposed on said elongated bands for securing said device about said hind quarters of said animal.

5. The urine collection device of claim 4 wherein said detachable means includes a double-sided adhesive tape having adhesives of different strengths on opposite surfaces thereof.

6. The urine collection device of claim 1 wherein said collection pouch means includes an integrally formed vulvar shield means adapted to conform to the external genitalia of a female dog.

* * * * *